Figure 1:
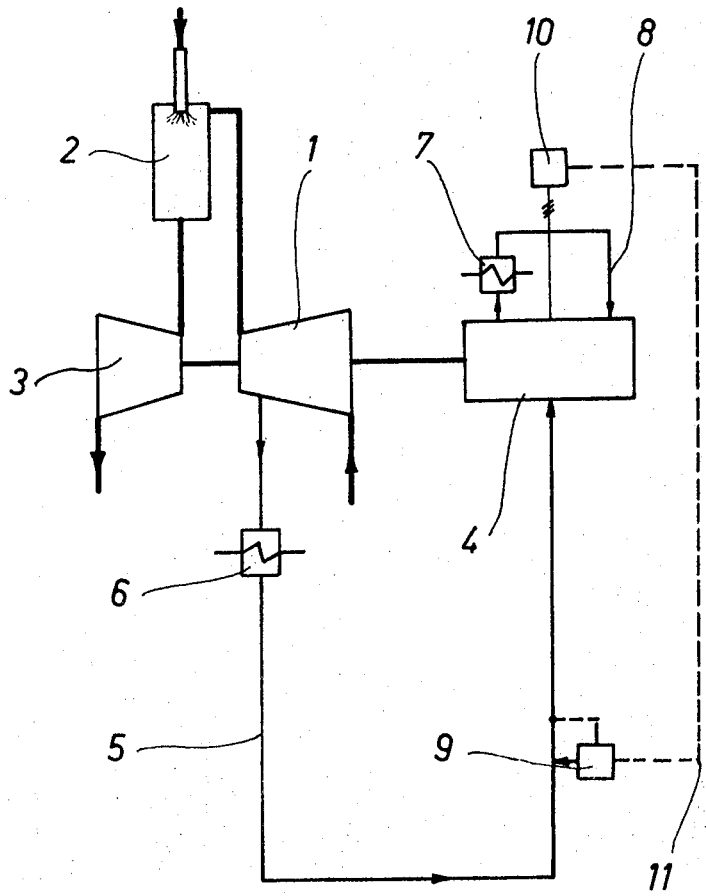

United States Patent [19]
Jampen et al.

[11] 3,816,751
[45] June 11, 1974

[54] APPARATUS FOR COOLING AN ELECTRICAL GENERATOR

[75] Inventors: Ulrich Jampen, Birr; Tadeusz Zaba, Wettingen, both of Switzerland

[73] Assignee: Brown, Boveri & Company Limited, Baden, Switzerland

[22] Filed: Oct. 30, 1972

[21] Appl. No.: 301,721

[30] Foreign Application Priority Data
Nov. 8, 1971  Switzerland...................... 16194/71

[52] U.S. Cl............................. 290/2, 290/52, 290/1, 60/39.18, 60/39.07
[51] Int. Cl................................................ H02k 9/00
[58] Field of Search........ 417/405, 408; 60/39.18 C, 60/307, 39.06, 39.07; 290/2, 1, 52

[56] References Cited
UNITED STATES PATENTS

| | | | |
|---|---|---|---|
| 2,508,397 | 5/1950 | Kane....................................... | 290/2 |
| 2,618,431 | 11/1952 | Walker................... | 417/408 |
| 2,618,470 | 11/1952 | Brown et al. ...................... | 60/39.07 |
| 2,893,204 | 7/1959 | Anderson et al............... | 60/39.18 C |
| 2,934,655 | 4/1960 | Heller et al. ............................. | 290/2 |
| 2,970,434 | 2/1961 | Warren....................... | 60/39.18 C |
| 3,024,366 | 3/1962 | Yanagimachi......................... | 290/2 |
| 3,628,328 | 12/1971 | Matsuzawa........................... | 60/307 |

Primary Examiner—G. R. Simmons
Attorney, Agent, or Firm—Pierce, Scheffler & Parker

[57] ABSTRACT

A gas driven turbo-generator set including a compressor for the working medium fed to the turbine to drive the generator and compressor and wherein the generator is cooled by circulating the working medium through it from an extraction point on the compressor.

7 Claims, 2 Drawing Figures

APPARATUS FOR COOLING AN ELECTRICAL GENERATOR

The present invention relates to an improvement in a cooling arrangement for electric generators and more particularly for cooling the generator component of a gas driven turbo-generator set and wherein the working medium for the compressor-turbine set is circulated through the generator from an extraction point on the compressor.

Known methods of cooling electric generators include using air, the presssure of which exceeds that of the surroundings by an amount only sufficient to overcome friction losses along the flow path. A fan built into the generator is usually employed for this purpose. If the generator output exceeds a certain limiting value, the pressure, and hence the density, of the cooling air in the generator would have to be raised in order to achieve the necessary cooling effect. This, however, causes windage losses within the generator to increase substantially, and for this reason no generator cooling system using pressurised air has been built to date.

Hydrogen is therefore widely used as a cooling gas in lieu of air, the gas being under a positive pressure of up to several atmospheres. It has a cooling effect similar to that of air, but owing to its lower density the windage losses are much smaller. A hydrogen system, however, incurs considerable constructional costs, since it requires constant maintenance and must be supervised by operating personnel. To this is added the appreciable cost of sealing the generator and all piping and fittings owing to the risk of explosion when this gas mixes with air. Furthermore, leakage of hydrogen has to be compensated when the generator is shut down, and the oil pumps for the shaft seals have to remain in operation. To achieve minimum windage and flow losses, the gas pressure should be lowered as output is reduced, but this is complicated and expensive because of the loss of hydrogen when the gas is released. These disadvantages are most apparent in the case of a generating plant which is used only for short periods to cover peak loads. Such plant is often remotely controlled, making a simple construction desirable.

The use of helium involves similar disadvantages and constructional costs, but this gas has the advantage over hydrogen that it is not combustible.

The principal object of the present invention is to adequately cool a generator driven by a gas turbine in the simplest possible manner and without particular structural expense.

This objective is achieved in that the working medium conveyed by the compressor of the gas turbine set is employed as the cooling gas, this gas being under positive pressure which is created and maintained by the compressor.

A further aspect is that the compressor of the gas turbine set has the added task of bringing the gas for cooling the electric generator up to the pressure required for effective cooling. This is necessary especially when starting the plant because the cooling gas is usually at ambient pressure during shutdown. Since the pressure in the compressor depends, among other things, on speed, pressurising the generator on start-up takes a certain amount of time. In the event of variations in output, the pressure of the cooling gas in the generator varies with the pressure in the compressor. This is desirable because windage losses at partial load are then lower than if the high pressure required at maximum output is held constant. It is also possible to regulate the pressure of the cooling gas in the generator in relation to generator output in accordance with any desired function, such that windage losses are no greater than is absolutely necessary. Disregarding pressure rises in the compressor and the associated pressurising of the cooling gas, it is necessary during operation to compensate only the small quantities of gas leaking from the generator seals. The additional loading of the compressor, even during start-up, is therefore slight, and the compressor need be made no larger than is required to meet the demands of the gas turbine.

If the generator to be cooled is driven by an open-cycle gas turbine, the cooling gas used is air which is brought up to pressure by the compressor of the gas turbine set. Although the windage losses increase approximately in direct proportion to the pressure, the generator can, on the other hand, be much more heavily loaded owing to the efficient removal of heat by the pressurised air. The efficiency of the generator drops slightly, but the gain in output is several times greater than the higher losses. Gas leakage can easily be compensated so that generator seals can be made simple and sealing at standstill is not necessary. The compressor keeps the cooling air at a predetermined static pressure related to output. The air, which is also cooled during its passage through the system, is circulated by means of fans contained in the generator.

In the case of a closed-cycle gas turbine set, where the working medium may, for example, be carbon dioxide, hydrogen or helium, this medium can be used for cooling the generator and maintained at pressure by the compressor of the set in the same way as described for air as the coolant. It is also possible to connect the generator to a secondary flow of the working medium, and to pass this as coolant through the generator, in which case there is no need for a separate circulating fan. Friction losses along the coolant flow path will thus be covered by the compressor of the gas turbine set.

Figure 2:
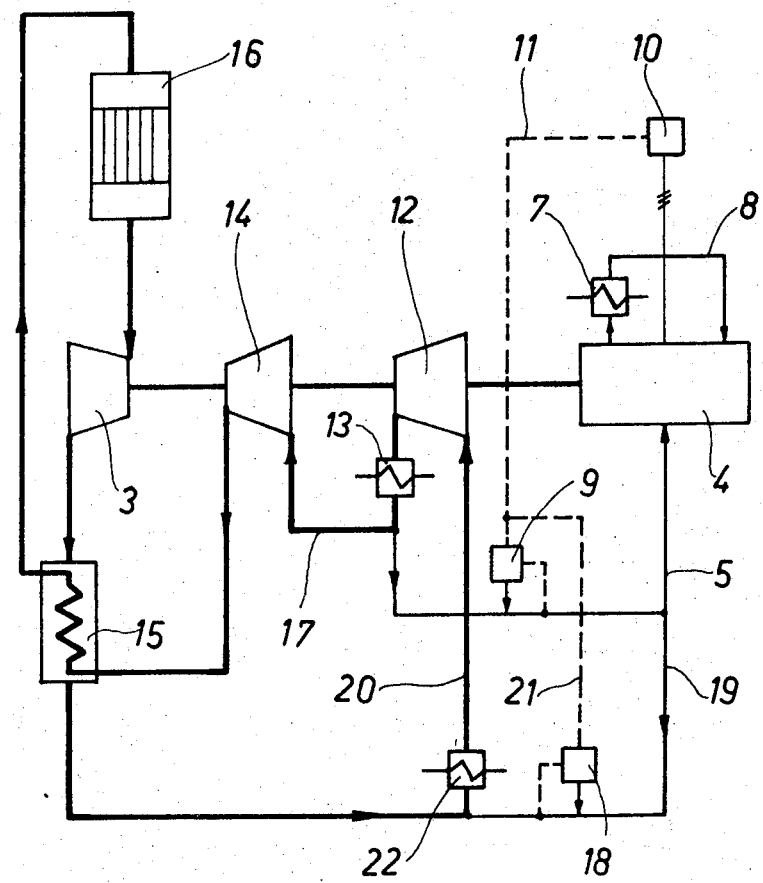

A number of examples of the invention are shown diagrammatically in the accompanying drawings and will be described in more detail below. The drawings show:

FIG. 1 — a cooling system for a gas turbine set with the working medium in an open-cycle arrangement;

FIG. 2 — a cooling system for a gas turbine set with the working medium in a closed-cycle arrangement.

As shown in FIG. 1, combustion air is compressed in compressor 1 and then passes via combustor 2 into gas turbine 3, where the thermal energy of the combustion gases is converted into mechanical work. The gas turbine drives not only the compressor, but also the air-cooled electric generator 4. In order to being the cooling air up to the required pressure on start-up, the generator 4 is connected direct to compressor 1 by means of pipe line 5. Intercooler 6 is incorporated into pipe line 5 to cool the air, which has become heated by the compression process, before it flows to generator 4. To re-cool the air, the generator incorporates cooler 7. This is located in the closed flow path 8 of the cooling air, which is circulated by integral fans (not shown).

Connecting pipe 5 can lead from the exhaust of compressor 1, or from any intermediate stage. If pipe line 5 includes no throttle or non-return valve, the pressure in the generator is approximately the same as at the extraction point. At constant load, only leakage losses are made up by way of pipe 5. With variable load the air can flow alternatively in both directions. If an increase in load requires more power from the gas turbine, the pressure in compressor 1 rises, and hence also in generator 4. In the event of decreasing load, the pressure in the compressor falls and cooling air can flow back from the generator to the compressor. When selecting the extraction point it must be remembered that the pressure in the generator, and hence also at the extraction point must be high enough to ensure an adequate cooling effect.

Another possibility is for pipe line 5 to start from a point on the compressor having a sufficiently high pressure, and to fit a pressure-regulating valve 9, a reducing valve for example, in the pipe line 5. The pressure in the generator will, in this way, be kept at a constant high value which must be high enough to ensure that the cooling effect is still sufficient at the maximum generator output. A disadvantage of this is that the pressure is too high at partial load, and hence the windage losses are too great.

The optimum value of the pressure of the cooling air is obtained if the pressure-regulating valve 9 in pipe line 5 is made controllable in relation to output. This can be done either by hand or with the air of an output-measuring device 10 which acts on the pressure-regulating valve 9, as indicated by the broken line 11 in FIG. 1.

Connecting pipe 5 can terminate at any point along the flow path 8 of the cooling air in the generator.

FIG. 2 shows an installation in which the gas turbine set is of the closed-cycle type. The working medium flows succesively through low-pressure compressor 12, cooler 13, high-pressure compressor 14, heat exchanger 15, in which it is preheated, component 16, which can be a reactor or a heat exchanger for heating the working medium, gas turbine 3, once more through heat exchanger 15 and then through after-cooler 22, after which the working medium again passes into low-pressure compressor 12. The electric generator 4 is mounted on the same shaft as gas turbine 3 and the two compressors 12 and 14.

Connecting pipe 5, which leads to the generator 4 and thus maintains it at the same pressure as obtains in pipe line 17 interconnecting compressors 12 and 14, branches off the interconnecting pipe 17 at a point after inter-cooler 13.

Pressure-regulating valve 9 can be incorporated into connecting pipe 5 for the same reasons as given in the description of FIG. 1. In this case, return line 19, monitoried by throttle valve 18, is included. This line branches off connecting pipe 5 after pressure-regulating valve 9 and terminates at the intake pipe 20 of the low-pressure compressor 12. If pressure-regulating valve 9 maintains a constant pressure, throttle valve 18 remains closed during operation. It is opened only when the plant is shut down, so that the cooling gas can escape in order to relieve the pressure in the generator and to reduce leakage losses in the working-medium circuit. If the pressure-regulating valve 9 is actuated in terms of output, throttle valve 18 must be varied simultaneously and in the same sense in such a way that it maintains a pressure always lower by a small amount than pressure-regulating valve 9. Throttle valve 18 is actuated by way of line 21, which branches off line 11.

With the installation as shown in FIG. 2, connecting pipe 5 can similarly terminate at any point along the closed flow path of the cooling gas in generator 4.

We claim:

1. In a gas-driven turbo-generator set wherein the gaseous working medium is first compressed in a compressor, then heated to impart energy thereto, and then passed through a turbine which is shaft coupled to the compressor and to an electric generator, the improvement for effecting generator cooling which comprises means for conveying a portion of said gaseous working medium following compression in said compressor to said generator for cooling the latter, said generator including a closed flow path including fan means for circulating the pressurized gaseous working medium through it and a cooler for removing heat therefrom.

2. The invention as defined in claim 1 wherein said turbo-generator set operates on an open cycle and wherein air constitutes the gaseous working medium used for generator cooling and for driving the turbine.

3. The invention as defined in claim 1 wherein said means for conveying a portion of the gaseous working medium pressured in said compressor to said generator includes a pressure regulating valve.

4. The invention as defined in claim 3 and which further includes means controlling said pressure regulating valve in accordance with the output delivered by said generator such that the pressure of the gaseous working medium changes in the same sense as the generator load.

5. The invention as defined in claim 1 and which further includes valve controlled means for allowing escape of the cooling gas from said generator when said turbo-generator set is shut down thereby to relieve the pressure within the generator.

6. The invention as defined in claim 1 wherein said means for conveying a portion of the gaseous working medium pressurized in said compressor to said generator includes a pressure regulating valve controlled in accordance with the output delivered by said generator such that the pressure of the gaseous working medium changes in the same sense as the generator load, and which further includes a return path for the gaseous working medium from said generator to the intake side of said compressor, said return path including a throttle valve which opens only when said turbo-generator set is shut down, and said throttle valve likewise being controlled by the generator output and in the same sense as said pressure regulating valve.

7. The invention as defined in claim 1 wherein said compressor includes at least two stages interconnected by an interstage cooler, and wherein said means for conveying a portion of said gaseous working medium to said generator includes a pipe line connected to the gas outlet side of said interstage cooler.

* * * * *

UNITED STATES PATENT OFFICE
CERTIFICATE OF CORRECTION

Patent No. 3,816,751            Dated    June 11, 1974

Inventor(s)  ULRICH JAMPEN and TADEUSZ ZABA

It is certified that error appears in the above-identified patent and that said Letters Patent are hereby corrected as shown below:

[73[ Assignee:        BBC BROWN BOVERI & COMPANY LIMITED
                      Baden, Switzerland Signed and sealed this 8th day of October 1974.

(SEAL)
Attest:

McCOY M. GIBSON JR.                    C. MARSHALL DANN
Attesting Officer                      Commissioner of Patents